United States Patent [19]

Caple et al.

[11] Patent Number: 4,484,409

[45] Date of Patent: Nov. 27, 1984

[54] PREVENTION OF FREEZING AT MODERATE SUPERCOOLING USING SYNTHETIC POLYMERIC ICE NUCLEATION INHIBITORS

[75] Inventors: Gerald Caple; Richard G. Layton, both of Flagstaff, Ariz.

[73] Assignee: University Patents, Inc., Norwalk, Conn.

[21] Appl. No.: 363,321

[22] Filed: Mar. 29, 1982

[51] Int. Cl.³ .............................................. A01G 1/00
[52] U.S. Cl. ............................................................. 47/2
[58] Field of Search ........................................ 47/2, 58

[56] References Cited

U.S. PATENT DOCUMENTS

| | | | |
|---|---|---|---|
| 2,961,798 | 11/1960 | Wells | 47/2 X |
| 3,045,394 | 7/1962 | Coulter | 47/2 X |
| 4,219,965 | 9/1980 | Freebairn et al. | 47/2 |

Primary Examiner—Robert E. Bagwill
Attorney, Agent, or Firm—Jerome M. Teplitz; Barbara A. Shimei

[57] ABSTRACT

A synthetic polymeric ice nucleation inhibitor is employed for protecting light frost-sensitive plants against frost injury by inhibiting the ice-nucleating activity of the ice-nucleating bacteria normally present on the plants, and thereby reducing the temperature at which frost injury occurs. The inhibitor is applied to the plants in the form of a solution of a synthetic polymer having covalently bound to its main backbone chain both pendant hydrophobic groups and pendant hydrophilic groups. The ratio of and average intermolecular spacing between the hydrophobic groups and the hydrophilic groups in the polymer, and the molecular weight of the polymer, are selected so that in combination they provide the polymer with a limited room temperature water solubility within the range of from about 1 $\mu$g/ml to about 100 mg/ml. The inhibitor is also applicable for reducing the temperature at which ice formation occurs in any other medium containing active ice nucleation initiators, such as, for example, the atmosphere and concrete; as well as having utility as a species-specific bactericide, such as, for example, against *Pseudomonas syringae*.

18 Claims, No Drawings

PREVENTION OF FREEZING AT MODERATE SUPERCOOLING USING SYNTHETIC POLYMERIC ICE NUCLEATION INHIBITORS

BACKGROUND OF THE INVENTION

This invention relates to the inhibition of ice formation at moderate supercooling temperatures and, more particularly, to the protection of light frost-sensitive plants against frost injury.

Damage to crops by frost is one of the leading causes of loss in agricultural output due to natural phenomenon variability in the world, to be exceeded only by drought and flooding, pests and disease. It is estimated that from 5–15% of the gross world agricultural product may be so lost to frost damage in one year. In some regional areas (i.e., countries, valleys) the loss may approach 100%.

The greatest amount of frost damage to sensitive crops does not occur in northern or cold climates. Instead, it occurs at mid- and low-latitudes and at high altitude equatorial locations where high value food crops such as soybean, corn, orchard fruits, and vegetables are grown. For instance, the orchards of California, vineyards of Italy, the corn and soybeans of Iowa, and potatoes of Ecuador all suffer damage each year from the same phenomenon—light night frost at temperatures from $-1°$ C. to $-4°$ C.

It has been estimated by the United States Department of Agriculture that about 1.5 billion dollars of agricultural products is lost to frost damage in the United States each year. The worldwide total is probably in excess of 10 billion dollars.

For the most part, present frost protection methods are centered around the principle of maintaining heat in a crop to keep it from cooling below the freezing point where frost is imminent. This is done by a variety of methods such as burning oil or natural gas, stirring the air over crops, sprinkling the crops with water, and covering them. With the cost of petroleum becoming more expensive and pressures against polluting the air with anthropogenic fires, heating large areas of agricultural land to prevent frost damage may become increasingly unpopular in the future. Also, these measures all require a considerable amount of equipment, trained and available manpower, and are capital intensive.

In addition to these physical methods, chemical methods of frost protection for growing plants have been attempted by application of various chemical compounds onto the plants with the view of lowering the temperature at which the plant tissues would freeze. These previously proposed chemical methods have tended to be unreliable, expensive, and ecologically unsound.

Frost damage to plants occurs when intracellular liquid in the plant tissues freezes with resulting rupture of adjacent cell walls and cell membranes. It is known that plant tissues may supercool to temperatures of around $-6°$ C. in the absence of external ice nuclei. The internal plant tissues do not generally initiate ice at temperatures warmer than this $-6°$ C. threshold.

It has recently been established that there are a very few bacteria species which can act as ice-forming nuclei at relatively warm temperatures, i.e., $-1°$ C. to $-3°$ C. The bacteria *Erwinia herbicola* and *Pseudomonas syringae* have been identified as being representative, if not the sole species, of these bacteria acting as ice nucleants on plant tissues.

To protect plants from frost damage, it is therefore desirable to have available means for reducing the populations or otherwise inhibiting the ice-nucleating activity of the ice-nucleating bacteria on plant leaves, so as to thereby reduce the temperature at which frost injury occurs to temperatures approaching $-6°$ C. The use of various chemical bactericides for this purpose has not thus far proven to be a satisfactory approach, since besides being expensive and ecologically unsound, such bactericides have not been species specific to the ice-nucleating bacteria, but instead have been deleterious to the plants by also killing the beneficial bacteria.

Another recently proposed approach to this problem, as described in the Arny et al. U.S. Pat. Nos. 4,045,910 and 4,161,084, incorporated herein by reference, is to apply to the plants competitive non-ice-nucleating bacteria in an amount sufficient to increase the proportion of non-ice-nucleating bacteria to ice-nucleating bacteria from that normally present on the plants, thereby reducing the probability that sufficient numbers of ice-nucleating bacteria will be able to grow on the plant leaves. This approach requires application of the competitive bacteria at a rather substantial time prior to the onset of freezing temperature and/or at a rather early stage of plant growth so as to enable the competitive bacteria to adequately establish themselves on the plant leaves in order to be effective, and has not been found to be fully reliable or confidently repeatable in field trials.

SUMMARY OF THE INVENTION

It is, accordingly, a primary object of the present invention to provide an improved method for preventing ice formation at moderate supercooling temperatures in various media containing active ice nucleation initiators.

Another object of the invention is to provide an improved method for protecting plants against frost injury, which is more reliable, convenient and economical than the prior art frost protection procedures.

Still another object of the invention is to provide an improved method for protecting plants against frost injury in accordance with the preceding object, which can suitably be employed at any stage of plant growth and as late as immediately prior to the onset of freezing temperature.

A further object of the invention is to provide an improved method for protecting plants against frost injury in accordance with the preceding objects, which is ecologically sound and which is not harmful to plants and animals.

A still further object of the invention is to provide an ice nucleation-inhibiting composition which specifically inhibits the ice-nucleating activity of ice nucleation initiators, including ice-nucleating bacteria normally present on plants, without harming any other living organism.

Yet another object of the invention is to provide an ice nucleation-inhibiting composition in accordance with the preceding object, which is convenient and economical to prepare and store and which is suitable for being conveniently and economically sprayed onto plants by means of conventional irrigation sprinklers or insecticide foggers.

The above and other objects are achieved in accordance with the present invention by means of synthetic polymeric ice nucleation inhibitors which are effective for inhibiting the ice-nucleating activity of a broad spectrum of ice nucleation initiators, including all of the various ice-nucleating bacteria normally present on plants, without in any way harming any other living organism. The synthetic polymeric ice nucleation inhibitors of the present invention are employed in the form of a solution of a synthetic polymer having covalently bound to its main backbone chain both pendant hydrophobic groups and pendant hydrophilic groups. The ratio of and average intermolecular spacing between the hydrophobic groups and the hydrophilic groups in the polymer, and the molecular weight of the polymer, are selected so that in combination they provide the polymer with a limited room temperature water solubility within the range of from about 1 μg/ml to about 100 mg/ml. When topically applied to light frost-sensitive plants at a time sufficiently prior to the on-set of freezing temperature and in a sufficient concentration of the polymer, such solutions protect the plants against frost injury by inhibiting the ice-nucleating activity of the ice-nucleating bacteria normally present on the plants, thereby reducing the temperature at which frost injury occurs to temperatures approaching −6° C.

The ice nucleation inhibitors of the present invention may conveniently and economically be prepared and sprayed onto the plants by means of conventional irrigation sprinklers or insecticide foggers. Application may suitably be carried out at any stage of plant growth, and at a time ranging from immediately prior to the on-set of freezing temperature up to about forty-eight hours prior to the on-set of freezing temperature. They can be conveniently stored as a powder and solubilized when ready for use. Since they can be suitably prepared so as to be biodegradable and substantially non-toxic to plants and animals, their application to plants should be ecologically sound.

DESCRIPTION OF PREFERRED EMBODIMENTS

The synthetic polymeric ice nucleation inhibitors in accordance with the present invention have main backbone chains to which are covalently bound both pendant hydrophobic groups and pendant hydrophilic groups. The backbone chain atoms play only a minor role, and may suitably be carbon, nitrogen or oxygen atoms. Suitable hydrophobic groups include alkyl groups, such as methyl, ethyl, propyl, butyl, or the like; aryl groups, such as phenyl, benzyl, substituted phenyl, substituted benzyl, or the like; alkoxy groups, such as methoxy, ethoxy, propoxy, or the like; and ester groups, such as carbomethoxy, carboethoxy, or the like. Suitable hydrophilic groups include hydroxyl groups; carboxyl groups; amide groups, such as pyrrolidone; polyhydroxy groups, such as glycerine and glycosides; polyether groups; sulfhydryl groups; ammonium salt groups, such as quaternary ammonium salts; carboxylate anion groups; sulfate groups; and phosphate groups.

The synthetic polymers useful in the present invention have limited room temperature water solubilities within the range of from about 1 μg/ml to about 100 mg/ml, preferably no greater than about 3 mg/ml. Such limited water solubility is provided to the polymer by synthesizing the polymer with the proper combination of (a) the ratio of the hydrophobic groups to the hydrophilic groups, (b) the average intermolecular spacing between the hydrophobic groups and the hydrophilic groups, and (c) the molecular weight of the polymer. While the optimum values for each of these parameters will depend on the nature of the particular hydrophobic and hydrophilic groups employed, some general guidelines have been derived on the basis of the experimental work thus far carried out.

In general, the ratio of the hydrophobic groups to the hydrophilic groups in the polymer are suitably within the range of from about 1:1 to about 3:1, with approximately 2:1 having been found to be optimal. The average intermolecular spacing between the hydrophobic groups and the hydrophilic groups in the polymer is preferably no greater than about 15 Angstroms, since spacings greater than this have been found to generally render the polymer too water-insoluble. The molecular weight of the polymer may suitably be at least about 1200 daltons, and may be as high as 100,000 daltons or more, with a molecular weight range of from about 5,000 to about 15,000 daltons having been found to be optimal. It should be noted that these molecular weight determinations have been made based on the intrinsic viscosity measurements of the polymers, in accordance with the following formula, wherein a was assumed to be 0.5:

$$\text{Intrinsic viscosity} = k \times M^{a}.$$

The synthetic polymers for use in the present invention may suitably be synthesized by the copolymerization of a pendant hydrophobic group-containing polymerizable monomer and a pendant hydrophilic group-containing polymerizable monomer, employing free radical polymerization techniques well known in the art. The properties of the polymer are controlled by varying the ratio of monomers and the amount of free radical polymerization initiator, e.g., a peroxide initiator. Suitable pendant hydrophobic group-containing polymerizable monomers include, for example, alkyl acrylates or methacrylates, alkyl vinyl ethers, alkyl allyl ethers, styrene, vinyl acetate, allyl acetate, propylene, isobutylene, alkyl cinnamates, dialkyl maleates, dialkyl fumarates, alkyl vinyl ketones, and the like. Suitable pendant hydrophilic group-containing polymerizable monomers include, for example, maleic acid or anhydride, acrylamide, methacrylamide, N-vinyl pyrrolidone, glycidyl methacrylate, allyl glycosides (e.g., allyl galactoside), omega-alkenyl acids, vinyl sulfonic acid, acrylate or methacrylate salts, allyl alcohol, and the like.

For use as an ice nucleation-inhibiting composition in accordance with the present invention, the synthetic polymer should be in the form of a solution, preferably an aqueous solution, suitably having a concentration of the polymer ranging from about $10^{-7}$ molar up to a saturated solution. Preferably, the concentration of the polymer in the solution is no greater than about 3 mg/ml. The optimal concentration of the polymer in the solution is not based upon the colligative properties of the polymer, but rather on the active ice nucleation initiator content of the medium to which the inhibitor solution is to be applied. For example, when being applied to plants to inhibit the ice-nucleating activity of the ice-nucleating bacteria present on the plants, optimal concentrations could be determined by bacterial count tests.

The ice nucleation-inhibiting compositions of the present invention may suitably be topically applied to the plants by spraying, for example, by means of conventional irrigation sprinklers, insecticide foggers, or small hand sprayers. The composition should be sprayed on the plants in an amount sufficient to wet the plant leaves. For a typical leaf, assuming good wetting, and a concentration of ice-nucleating bacteria of $10^6$ cells per $cm^2$ of leaf surface, for optimum frost protection, the application should not fall below about 0.3 mg of polymer per $cm^2$ of leaf surface. This figure would have to be increased for higher bacterial counts. Under proper conditions, significant frost protection can be obtained with concentrations as low as about 3 µg of polymer per $cm^2$ of leaf surface. Concentrations greater than 0.3 mg of polymer per $cm^2$ of leaf surface can be used, but other than providing a safety factor, will generally offer no significant gains in protection.

In order to obtain satisfactory frost protection with the ice nucleation-inhibiting compositions of the present invention, the inhibitor solution should be applied to the plants at a time ranging from immediately prior to the on-set of freezing temperature up to about forty-eight hours prior to the on-set of freezing temperature. Optimum results are obtained when the application takes place as close as possible to the on-set of freezing temperature.

The ice nucleation-inhibiting compositions of the present invention may suitably be applied to plants in conjunction with other known frost prevention compositions to obtain the maximum advantage of each technique. For example, the competitive non-ice-nucleating bacteria technique described in the Arny et al. U.S. Pat. Nos. 4,045,910 and 4,161,084, incorporated herein by reference, is generally ineffective for providing frost protection until a rather substantial time, e.g., approximately forty-eight hours, following application. By using the ice nucleation-inhibitors of the present invention in conjunction with the Arny et al. technique, such as, for example, by including non-ice-nucleating bacteria suspended in the inhibitor solutions of the present invention in an amount sufficient to increase the proportion of non-ice-nucleating bacteria to ice-nucleating bacteria from that normally present on the plants, the inhibitors of the present invention could provide frost protection to the plants for the time interval necessary for the competitive bacteria to adequately establish themselves on the plant leaves in order to become effective.

While not intending to be bound by or limited to any particular theory of the mechanism of action of the ice nucleation-inhibitors of the present invention, it is believed that the polymeric material constituting the active inhibitor inhibits the ice-nucleating activity of the ice-nucleating bacteria by binding to the cell walls of the bacteria in a manner so as to deactivate or block the ice nucleation sites present on the cell walls. In some instances, active transport sites in the cell wall may be blocked, depriving the cell of nutrient, and thereby killing the bacteria.

The light frost-sensitive plants protectable against frost injury by means of the ice nucleation-inhibiting compositions of the present invention, include a wide variety of high value food crops and ornamental plants, such as, for example, beans, corn, tomatoes, pumpkins, potatoes, soybeans, a full range of citrus fruits, apples, pears, hard nuts, and a full range of cereal crops. The inhibitors of the present invention may furthermore be prepared so as to be biodegradable and substantially non-toxic to plants and animals, and hence should present no environmental problems.

In addition to their use for protecting plants against frost injury, the ice nucleation-inhibiting compositions of the present invention can also be employed for reducing the temperature at which ice formation occurs in any of various other media containing active ice nucleation initiators. For example, the inhibitor compositions of the present invention, when sprayed into the atmosphere, have a potential use in weather modification. Some scientists believe that warm temperature ice nuclei are responsible for hail formation. Ice nuclei are also involved in rain, so that inhibition of their formation could possibly affect rainfall. Additionally, ice nucleation initiators present in concrete potentially could be inhibited by the ice nucleation-inhibiting compositions of the present invention in order to prevent undesired freezing of concrete prior to setting.

The synthetic polymer compositions of the present invention also have utility as species-specific bactericides. By proper selection of the hydrophilic and hydrophobic groups present in the polymer, the polymer may be designed so as to have specificity in its cell binding capabilities toward a given bacterial species, selectively blocking the active transport sites in the cell walls of such bacterial species and thereby selectively killing such bacterial species. For example, the plant pathogen *Pseudomonas syringae* has been found to be selectively killed by being contacted with a synthetic polymer composition in accordance with the present invention, wherein the polymer is a copolymer of a pendant hydrophobic group-containing polymerizable monomer, such as methyl methacrylate, and an allyl glycoside, such as allyl galactoside, in an approximate 1:1 molar ratio.

The invention is further illustrated by way of the following examples.

EXAMPLE 1

A copolymer of methyl acrylate and N-vinyl pyrrolidone was prepared by mixing 0.1 mole methyl acrylate (washed with dilute NaOH and freshly distilled) with 0.1 mole N-vinyl pyrrolidone. To the mixture was added 0.024 grams of benzoyl peroxide. This mixture was heated at 60° C. for 20 hours. The resulting copolymer was dissolved in acetone, the acetone solution was placed on a watch glass, and the acetone and unreacted methyl methacrylate allowed to evaporate. The crushed hardened polymer (0.855 g) was heated in 40 ml distilled water for 40 minutes. After filtration and drying, 0.600 g of polymer was recovered. This 0.600 g of polymer was dissolved in 50.0 ml distilled water (solution took place in 24 hours). The polymer solution was then filtered through 3.0 micron filters. Distilled water blanks were also filtered in the same manner.

For use in freezing experiments, a silver iodide solution was prepared, silver iodide being a well-known ice nucleating agent whose nucleation properties are well known. The silver iodide solution was prepared by diluting a mixture of 1.0 ml of $1.0 \times 10^{-3}$ M $AgNO_3$ and 20.0 ml of $1.0 \times 10^{-3}$ M KI to 50.0 ml. The test samples were made by mixing 1.0 ml of the silver iodide solution with 1.0 ml of the polymer solution prepared as above. Comparison blanks were prepared by mixing 1.0 ml of the silver iodide solution with 1.0 ml of distilled water filtered as described above.

The ice nucleation-inhibiting properties of the polymer solution were determined by means of the freezing drop method described by Vali (J. Atmos. Sci., Volume 28, pages 402-409, 1971). This testing procedure is carried out by drawing portions of the sample for testing into a sterile plastic syringe capped with a sterile needle and using the syringe and needle combination to make equal-sized drops on a thermally controlled stage. The drops are positioned on a thin square of Mylar or aluminum foil held on a cold surface with a light coating of mineral oil. Prior to the application of drops, the foil is coated with silicone resin using paper tissue, to assure that ice nucleation events are not influenced by extraneous nuclei on the foil surface. The silicone also causes drops to "bead up" forming hemispheres. 20 to 100 drops of 0.01 cm$^3$ are used for each test. The temperature of the sample is then gradually supercooled, and the freezing of the drops is detected visually based on changes of the drops from clear to opaque upon freezing. From the observed freezing temperatures of the drops, ice nucleus activity spectra can be constructed.

The results of the freezing experiments indicated that the methyl acrylate-N-vinyl pyrrolidone copolymer solution exhibited an average ice nucleation inhibition of approximately −4° C.

EXAMPLE 2

The freezing experiments of Example 1 were repeated, with variations in the mole ratio of methyl acrylate to N-vinyl pyrrolidone in the test copolymer. In comparison with the 1:1 mole ratio copolymer employed in Example 1, the 3:1 mole ratio copolymer exhibited an average ice nucleation inhibition of approximately −6° C., while the 2:1 mole ratio copolymer exhibited an average ice nucleation inhibition of approximately −8° C.

EXAMPLE 3

The freezing experiments of Example 1 were repeated, employing solutions of copolymers of methyl methacrylate and N-vinyl pyrrolidone of varying mole ratios. Each mole of methyl methacrylate provides two hydrophobic groups. The results of the test indicated optimal ice nucleation inhibition of approximately −8° C. with a copolymer having a methyl methacrylate to N-vinyl pyrrolidone mole ratio of 1:3.

EXAMPLE 4

This example illustrates the effect of the synthetic polymeric ice nucleation inhibitors of the present invention on the ice-nucleating activity of *Pseudomonas syringae*, one of the active ice-nucleating bacterial species normally present on plants.

A culture of *Pseudomonas syringae* was grown in a Koser citrate medium (5.7 g/L), using standard microbiological techniques. A solution of a copolymer of methyl methacrylate and N-vinyl pyrrolidone (mole ratio 1:3) at a concentration of about 5-10 mg/ml in a Koser citrate medium, was mixed with the *Pseudomonas syringae* culture, such that 1 ml of bacteria was diluted to 7 ml. A blank bacteria culture was diluted 1 ml to 7 ml with Koser citrate medium. The average nucleation temperature of this culture was −2° C., and the bacterial counts were 10$^{12}$ bacteria per ml.

Freezing tests were carried out as described in Example 1 above. The results of the freezing tests indicated that the copolymer solution exhibited an average ice nucleation inhibition of approximately −1.5° C.

EXAMPLE 5

This example illustrates the bactericidal effect of synthetic polymer solutions in accordance with the present invention on *Pseudomonas syringae*.

To 10 ml of 50% water, ethanol solution were added 2.0 grams methyl methacrylate, 1.5 grams alpha-allyl galactose, and 20 mg ammonium peroxydisulfate. This solution was heated at 60° C. for 24 hours, and then cooled. A precipitate (polymethylmethacrylate) was removed by filtration. The resulting solution was evaporated. Residual alpha-allyl galactose was removed by rinsing with absolute methanol. The resulting polymer was shown by galactose analysis to be an approximately 1:1 polymer. This polymer was then dissolved in Koser citrate medium to a concentration of 2.25 mg/ml. This solution was used to treat a culture of *Pseudomonas syringae* in Koser citrate medium at about 10$^9$ cells/ml. The copolymer solution reduced the cell count to 3×10$^8$ cells/ml in 12 hours. After 36 hours, the cell count was reduced to 0 in comparison with a control sample whose cell count was reduced to 2.9×10$^3$.

I claim:

1. A method for protecting light frost-sensitive plants against frost injury comprising applying to the plants a solution of a synthetic polymer having covalently bound to its main backbone chain both pendant hydrophobic groups and pendant hydrophilic groups, the ratio of and average intermolecular spacing between said hydrophobic groups and said hydrophilic groups and the molecular weight of said polymer combining to provide said polymer with a limited room temperature water solubility within the range of from about 1 g/ml to about 100 mg/ml, with the proviso that said pendant hydrophilic groups may not be pyrrolidone; said application being at a time sufficiently prior to the onset of freezing temperature and in a sufficient concentration of said polymer so as to inhibit the ice-nucleating activity of the ice-nucleating bacteria normally present on the plants, thereby reducing the temperature at which frost injury occurs.

2. The method of claim 1, wherein said water solubility of said polymer is no greater than about 3 mg/ml.

3. The method of claim 1, wherein the ratio of said hydrophobic groups to said hydrophilic groups in said polymer is within the range of from about 1:1 to about 3:1.

4. The method of claim 3, wherein said ratio is about 2:1.

5. The method of claim 1, wherein the average intermolecular spacing between said hydrophobic groups and said hydrophilic groups in said polymer is no greater than about 15 Angstroms.

6. The method of claim 1, wherein the molecular weight of said polymer is at least about 1200 daltons.

7. The method of claim 6, wherein said molecular weight is within the range of from about 5,000 to about 15,000 daltons.

8. The method of claim 1, wherein said hydrophobic groups are alkyl, aryl, alkoxy, or ester groups; and said hydrophilic groups are hydroxyl, carboxyl, polyhydroxy, polyether, sulfhydryl, ammonium salt, carboxylate anion, sulfate, phosphate, or amide groups, with the proviso that said amide may not be pyrrolidone.

9. The method of claim 1, wherein said polymer is a copolymer of a pendant hydrophobic group-containing polymerizable monomer and a pendant hydrophilic group-containing polymerizable monomer.

10. The method of claim 9, wherein said pendant hydrophilic group-containing polymerizable monomer is an allyl glycoside.

11. The method of claim 10, wherein said allyl glycoside is an allyl galactoside.

12. The method of claim 1, wherein the concentration of said polymer in said solution ranges from about $10^{-7}$ molar up to a saturated solution.

13. The method of claim 12, wherein the concentration of said polymer in said solution is no greater than about 3 mg/ml.

14. The method of claim 1, wherein said solution is an aqueous solution.

15. The method of claim 1, wherein said solution is applied to the plants by spraying in an amount sufficient to wet the plant leaves.

16. The method of claim 1, wherein said polymer is applied to the plants in an amount of at least about 3 $\mu$g per $cm^2$ of leaf surface.

17. The method of claim 16, wherein said polymer is applied to the plants in an amount of at least about 0.3 mg per $cm^2$ of leaf surface.

18. The method of claim 1, wherein said polymer is applied to the plants at a time ranging from immediately prior to the onset of freezing temperature up to about 48 hours prior to the onset of freezing temperature.

* * * * *

UNITED STATES PATENT AND TRADEMARK OFFICE
CERTIFICATE OF CORRECTION

PATENT NO. : 4,484,409

DATED : November 27, 1984

INVENTOR(S) : Gerald Caple and Richard G. Layton

It is certified that error appears in the above—identified patent and that said Letters Patent is hereby corrected as shown below:

Column 8, line 18, delete "I claim" and insert --We claim:-- in lieu thereof

Column 8, line 28, delete "g/ml" and insert --µg/ml-- in lieu thereof

Signed and Sealed this

Second Day of July 1985

[SEAL]

Attest:

DONALD J. QUIGG

Attesting Officer     Acting Commissioner of Patents and Trademarks